Patented Jan. 30, 1940

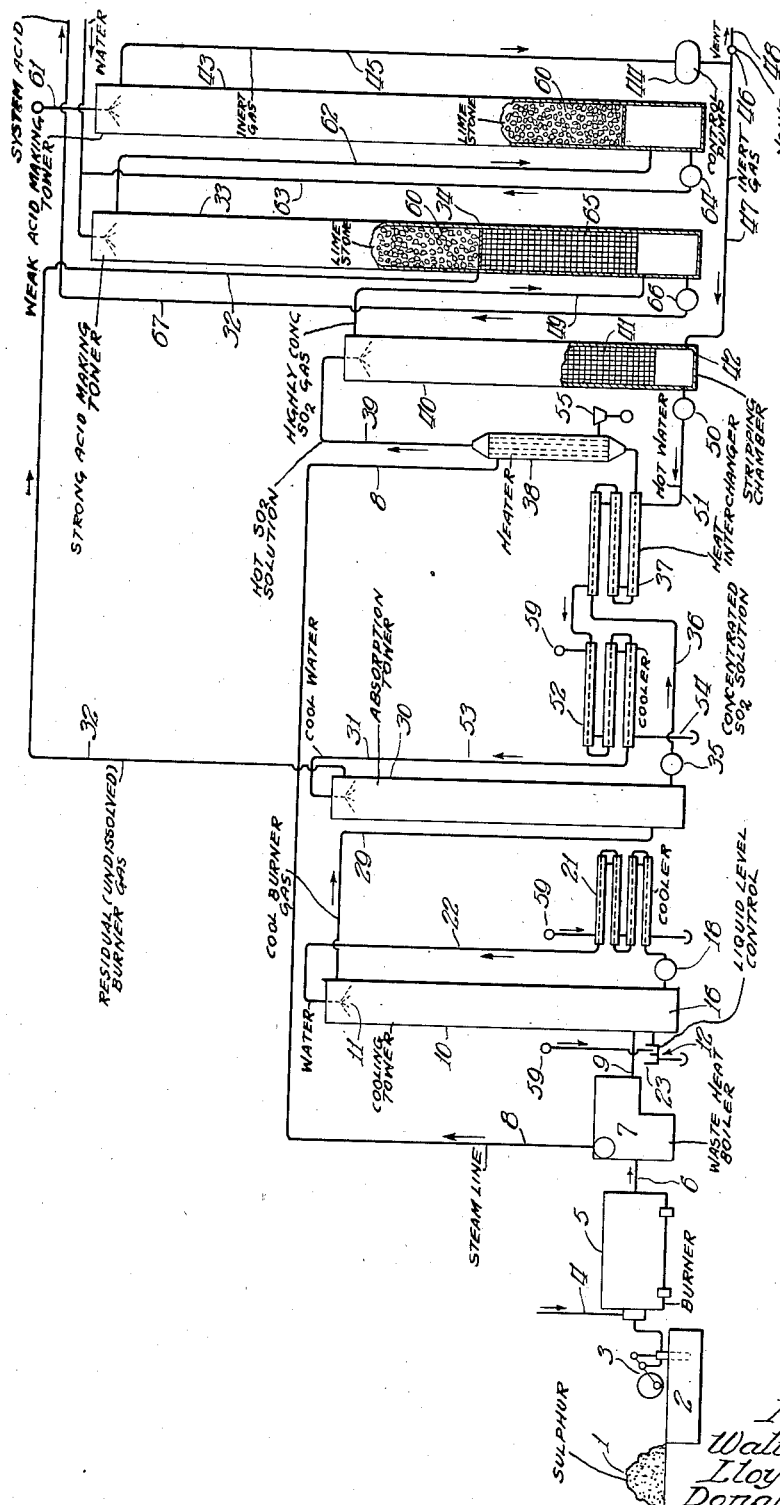

2,188,321

UNITED STATES PATENT OFFICE 2,188,321

PRODUCTION OF ACID FOR SULPHITE PULPING PROCESS

Walter H. Swanson, Menasha, Lloyd Lang, Kimberly, and Donald C. Porter, Appleton, Wis., assignors to Paper Patents Company, Neenah, Wis., a corporation of Wisconsin Application July 22, 1937, Serial No. 154,965

4 Claims. (Cl. 23—132)

The present invention relates to a process of producing acid for use in sulphite pulping and more in particular to the method and apparatus for producing sulphite acid having a high concentration of sulphur dioxide.

In the sulphite process for the production of chemical wood pulp, the reagent used for the decomposition of the wood comprises ordinarily a water solution of sulphur dioxide and, in addition, some alkali or alkaline earth metal salt of sulphur dioxide usually in the form of bisulphite. Long experience in the operation of the sulphite process has demonstrated that an acid relatively high in concentration of the dissolved sulphur dioxide component is very desirable. A high "free" acid, to use a term common in the art and meaning an acid high in concentration of sulphur dioxide per se, insures the production of pulp more uniform in quality, of high strength and in greater quantity or yield per unit of wood used. It is also possible to use lower cooking temperatures when using an acid high in free sulphur dioxide than is the case when an acid low in free sulphur dioxide concentration is employed.

Various attempts have been made in the past to produce a smoothly functioning system for the production of acid high in sulphur dioxide that would be both practical and economical. The process described in Richter Patent No. 1,724,421 patented August 13, 1929, is an example. The prior processes, however, have not been found for the most part to be commercially practical or economical.

It is an object of our invention to provide an improved process for producing a sulphite acid having a high concentration of sulphur dioxide.

It is also an object of our invention to provide a sulphite acid process which functions smoothly.

It is a further object of our invention to provide a method and apparatus for producing sulphite acid which is both commercially practical and economical.

Other objects of our invention will be apparent as the description hereinafter proceeds.

We have discovered, after extensive investigation, an improved process for producing sulphite acid having a high concentration of sulphur dioxide which comprises passing cooled sulphur burner gas through a dissolving chamber in contact with inert surface material and counter-current to a cooled flow or spray of water, the flow of the water being so regulated that it will dissolve from the burner gas a predetermined portion of sulphur dioxide to be used to produce the free sulphur dioxide component of the finished sulphite acid, passing the residual burner gas containing a small portion of undissolved sulphur dioxide to the acid making system or tower to form the sulphite salt or bisulphite component of the finished sulphite acid, passing the sulphur dioxide solution collecting at the bottom of the dissolving chamber through a recovery heat interchanger and then into a second heat interchanger which may derive its source of heat from the sulphur burning process, passing the heated solution through a stripping chamber counter-current to a controlled flow of inert gas preferably obtained from the acid making system or tower, the flow of inert gas being so regulated that the enriched gases leaving the stripping chamber contain a predetermined high concentration of sulphur dioxide, passing the heated water collecting at the bottom of the stripping chamber from which the sulphur dioxide has been removed by the stripping process through the recovery heat interchanger counter-current to the solution of sulphur dioxide coming from the dissolving chamber so as to partially cool the water and heat the solution, passing the partially cooled water through a cooler, passing the cooled water into the dissolving chamber for a repetition of the cycle, passing the sulphite salt of bisulphite solution in the acid making tower or towers counter-current to the enriched gas from the stripping chamber so as to form system sulphite acid containing the sulphite salt or bisulphite solution and the high concentration of sulphur dioxide.

For a better understanding of our invention, reference is made to the accompanying drawing, which is in the form of a flow diagram.

The process starts with the combustion of elemental sulphur 1 in correct ratio with air to produce a gas having a sulphur dioxide concentration of approximately 16 to 19 per cent. The equipment shown on the flow sheet by numerals 2, 3, 4 and 5 indicates a conventional spray burning system although this feature is not essential as any efficient burning system may be employed. In the process of burning the sulphur the heat evolved raises the resultant burner gas temperature to about 1800° to 2400° F. depending upon the degree of insulation of the burning equipment. Before the gas can be used for acid making, it is necessary, of course, to thoroughly cool it. In the preferred process cooling is performed in two stages, the first through the use of a waste heat boiler as indicated on the flow diagram at 7, and the second through a cooling tower as indicated at 10. The hot burner gas enters waste heat boiler 7 through line 6 and is reduced in temperature to about 450° F. The waste heat may be removed through line 8 as steam and in quantities varying according to the entering temperature of the gas (about 2.0 to 2.3 pounds steam per pound of sulphur burned) and may be used within our process as will be explained hereinafter.

The second stage of cooling is accomplished by passing the partially cooled burner gas through conduit 9 to cooling tower 10 where it passes counter-current to a spray of cold water 11. The water for the cooling spray is obtained preferably from the water collecting in the reservoir 16 at the bottom of tower 10 and is pumped by means of pump 18 through cooler 21 and passes by way of conduit 22 to the top of the tower for repetition of the cycle. Header 59 and box 23 represent a liquid level control 12 for supplying small amounts of water to the system to provide for the water lost by evaporation. Although the above cooling system is preferred, it will be understood that the water for the cooling spray may be obtained from any source and may be wasted to the sewer in the conventional manner. The particular cooling system shown on the flow sheet employs a continuous circulation of water with a consequent elimination of the loss of sulphur dioxide from this source.

The cooled burner gas leaves cooling tower 10 near the top and passes through line 29 and enters dissolving or absorption tower 30 near the bottom. The gas passes up the dissolving tower in contact with inert surface material (not shown) and counter-current to a quantitative cooled water spray or flow introduced at the top of the tower through line 31 with its accompanying spray nozzle. The quantity of water used is such that it will readily dissolve only that portion of the sulphur dioxide contained in the cooled burner gas (ordinarily about one-third of the $SO_2$ contained in the burner gas) which is desired as the free sulphur dioxide component of the system acid. The residual or undissolved burner gas, containing sufficient sulphur dioxide to produce the sulphite salt or bisulphite component of the system acid, is conducted through line 32 to the so-called "strong" acid making tower 33 and enters the bottom of the limestone packed portion of this tower at 34.

The dilute sulphur dioxide solution which collects at the bottom of tower 30 is forced by means of pump 35 through line 36, recovery heat interchanger 37 and a second heat interchanger 38, the temperature arising from about 86° F. to about 203° F. The second heat interchanger may derive its source of heat from the steam passing by way of line 8 from waste heat boiler 7 previously described. The condensate from heater 38 may be removed through trap 55 and may be returned to the boiler if desired for use as feed water. The heated solution is then introduced through line 39 into the top of stripping tower 40 preferably in spray form and flows downward through the stoneware packing 41 contained therein. Counter-current to this solution is passed a flow of inert gas 42 from which substantially all sulphur dioxide has been removed by reactions in acid making towers 33 and 43. Gas pump 44 which controls the flow of burner gas throughout the whole system so far described, receives the inert gas from tower 43 through line 45 and supplies the regulated amount of gas to stripping tower 40. This may be done by throttling valve 46 shown in line 47 so that a part of the inert gas instead of being wasted to the atmosphere as shown at 48, is diverted back to tower 40. This gas flowing through tower 40 strips the sulphur dioxide component from the heated solution passing through the tower and thus becomes highly enriched in sulphur dioxide concentration. By proper adjustment of the quantity of inert gas being recycled, it may be made to carry almost any concentration of sulphur dioxide up to 60 per cent by volume when leaving tower 40. Under normal operating conditions a concentration of about 30 per cent is very satisfactory. This enriched gas is then introduced through line 49 into tower 33, the "strong" tower of the acid making system near its bottom. Traveling up the tower counter-current to the sulphite salt or bisulphite solution, the sulphur dioxide in the gas is dissolved in this solution to form the free sulphur dioxide component of the system acid. The high sulphur dioxide gas concentration results in a high free concentration in the system acid since sulphur dioxide closely obeys "Henry's law." As is well known, this law states in substance that in any gas-liquid system the concentration of a component in the liquid phase or in solution is directly proportional to its concentration in the gaseous phase.

The hot water in tower 40 stripped practically free of its sulphur dioxide component as described above, collects at the bottom and is removed by pump 50. It is forced through line 51 and recovery heat interchanger 37 counter-current to the flow from tower 30 and gives up a large part of its heat to the solution from the latter tower. This arrangement permits a substantial heat recovery within the system itself and with a heat interchanger properly designed as to capacity, makes it possible to carry out the heating phase with only that steam generated in waste heat boiler 7. As previously indicated, second heat interchanger 38 utilizes this steam to complete the heating of the sulphur dioxide solution before introduction into the stripping tower.

An additional heat interchanger or cooler 52 is used as recovery heat interchanger 37 cannot completely cool the water from the tower 40 to the temperature desired in order to permit its re-use in absorption tower 30. The water from interchanger 37 flows through cooler 52 counter-current to cooling water from header 59 and then through line 53 into tower 30 where it is again used as a solvent for sulphur dioxide in the burner gas. The cooling water from cooler 52 may be wasted to the sewer as shown at 54 or may be utilized further in the process at some needed point.

The acid making towers 33 and 43 and the accessory pipes and pumps represent the conventional "tower system" used in sulphite acid making. Both towers are filled to a considerable portion of their volume with limestone 60 or equivalent material. Water is introduced through line 61 into tower 43, the so-called "weak" tower, in quantities sufficient to meet the needs of the pulp digesters and flows downwardly over the limestone counter-current to gas weak in sulphur dioxide from the top of tower 33, which flows into tower 43 near the bottom through line 62. The sulphur dioxide dissolves in the water and reacts with the limestone to form the sulphite salt or bisulphite solution. This weak solution is then pumped through line 63 by means of pump 64 to the top of tower 33 and again flows down through lime rock 60 counter-current to the enriched or stronger sulphur dioxide containing gas introduced from tower 40 through line 49 previously described. The bottom portion of this tower, the so-called "strong" tower, is filled with inert checker work or stone ware packing 65 over which the solution complete in its sulphite salt or bisulphite concentration flows and is brought into contact with the high concentration sulphur dioxide containing gas from the stripping tower concentrating system. The system acid may be removed from tower 33 by pump 66 through line 67. In practice towers 33 and 43 are identical and can be reversed in operation either one serving as the weak or the strong tower.

The acid making process just described, while the one commonly used in the trade, is not the only one employed. A procedure wherein the hydrate of an alkaline earth such as calcium, calcium-magnesium mixture, or magnesium, is used, may be also employed. In this case the hydrate in water suspension called milk of lime if calcium is used, is caused to flow through a simple absorption tower counter-current to the burner gas. This is the so-called "milk of lime" system. It is to be understood that our process for handling and concentrating sulphur dioxide may be used just as effectively with this system as with the tower system used for illustration.

The next phase of our acid making process is the fortification of the properly concentrated system acid with sulphur dioxide recovered from the cooking process. The recovery of reclaimed gas is described in detail in the Swanson and Porter Patent No. 2,141,886, December 27, 1938, for "Reclaimed gas recovery process."

The process and apparatus for producing system or raw acid containing a high concentration of sulphur dioxide described above is smooth functioning, easy to operate and employs operating units economical both as to size and maintenance cost. The use of the waste heat liberated during the combustion of the sulphur and the recycling of the water throughout the system makes elaborate heating, refrigerating, and high pressure equipment unnecessary. The flow of water in the dissolving chamber, the flow of the residual undissolved gas to the acid making system to form the sulphite salt and the flow of inert gas in the stripping chamber may easily be regulated or controlled so as to produce finished system acid of the desired concentrations.

The sulphur burning equipment, waste heat boiler, cooling tower, dissolving tower, stripping tower, heat interchangers, acid making towers, etc., included in our invention are of the conventional type and are well known in the art.

Although we have illustrated our invention showing certain specific embodiments therein, it will be understood that our invention is not limited thereto. All variations coming within the scope and spirit of our invention are intended to be covered by the following claims.

We claim:

1. A process of producing sulphite acid having a high concentration of free sulphur dioxide which comprises passing cooled sulphur burner gas through a dissolving chamber counter-current to a flow of cooled water, the flow of water being so regulated that it will dissolve only that portion of sulphur dioxide to be used to produce the free sulphur dioxide component of the sulphite acid, passing all of the residual burner gas containing the undissolved sulphur dioxide directly to an acid-making tower to form the sulphite salt component of the finished acid, passing the solution containing the dissolved sulphur dioxide through a heat interchanger to raise the temperature thereof, passing the heated solution through a stripping chamber counter-current to a controlled flow of inert gas obtained from the acid-making tower, the flow of inert gas being so regulated that the gases leaving the stripping chamber contain a high percentage of free sulphur dioxide, passing the heated water from which the sulphur dioxide has been removed by the stripping process through the heat interchanger counter-current to the solution of sulphur dioxide coming from the dissolving chamber so as to partially cool the water and heat the solution, passing the partially cooled water through a cooler, passing the cooled water into the dissolving chamber for a repetition of the cycle, and passing the enriched gas from the stripping tower counter-current to the sulphite salt solution in the acid-making tower so as to form the finished sulphite acid containing a high concentration of free sulphur dioxide.

2. A process of preparing sulphite pulping acid high in concentration of free sulphur dioxide which comprises passing cooled sulphur burner gas through a dissolving chamber counter-current to a spray of cooled water, the spray of water being so regulated that it will dissolve from the burner gas only that portion of sulphur dioxide to be used as the free sulphur dioxide component of the system sulphite acid, passing all of the residual burner gas containing the undissolved portion of sulphur dioxide directly to the strong acid-making chamber to form the sulphite salt component of the system sulphite acid solution, passing the solution containing the dissolved sulphur dioxide through a recovery heat interchanger so as to partially heat the solution, passing the partially heated solution through a second heat interchanger so as to raise the temperature thereof, passing the heated solution through a stripping chamber counter-current to a controlled flow of inert gas obtained from the weak acid making tower, the flow of inert gas being so regulated that the enriched gases leaving the stripping chamber contain a predetermined amount of sulphur dioxide, passing the heated water from which the sulphur dioxide has been removed by the stripping process through the recovery heat interchanger counter-current to the solution of sulphur dioxide coming from the dissolving chamber so as to partially cool the water and partially heat the solution, passing the partially cooled water through a cooler, passing the cooled water into the dissolving chamber for a repetition of the cycle, and passing the enriched gas from the stripping chamber counter-current to the sulphite salt solution in the strong acid-making chamber so as to form the system sulphite acid haxing a high concentration of free sulphur dioxide.

3. A process of preparing sulphite pulping acid containing a high concentration of free sulphur dioxide which comprises burning sulphur in air so as to form sulphur dioxide, passing the hot sulphur dioxide burner gas through a waste heat boiler so as to partially cool the gas, passing the partially cooled gas through a cooling tower counter-current to a spray of cool water so as to further cool the gas, passing the cooled burner gas through a dissolving chamber counter-current to a flow of cooled water, the flow of water being so regulated that it will dissolve only from the burner gas a predetermined portion of sulphur dioxide to be used as the free sulphur dioxide component of the system sulphite acid, passing all of the residual burner gas containing the undissolved sulphur dioxide directly to the limestone portion of the strong acid-making chamber to form the bisulphite salt component of the system sulphite acid, passing the solution containing the dissolved sulphur dioxide through a recovery heat interchanger so as to partially heat the solution, passing the partially heated solution through a second heat interchanger which derives its heat from the hot burner gas which is partially cooled in the waste heat boiler, passing the heated solution through a stripping chamber counter-current to a controlled flow of inert gas coming from the weak acid-making chamber, the flow of inert gas being so regulated that the enriched gases leaving the stripping chamber contain a predetermined amount of sulphur dioxide, passing the heated water from which the sulphur dioxide has been removed by the stripping process through the recovery heat interchanger counter-current to the solution of sulphur dioxide coming from the dissolving chamber so as to partially cool the water, passing the partially cooled water through a cooler, passing the cooled water into the dissolving chamber for a repetition of the cycle, and passing the enriched gas from the stripping chamber counter-current to the bisulphite salt solution in the strong acid-making chamber so as to form the finished system sulphite acid containing the sulphite salt solution and the high concentration of free sulphur dioxide.

4. In an apparatus for producing sulphite acid having a high concentration of free sulphur dioxide, a dissolving chamber, means for introducing cool sulphur burner gas into said chamber, means for introducing a controlled flow of cool water into said chamber so that the water will flow counter-current to said gas and dissolve therefrom only that portion of sulphur dioxide to be used as the free sulphur dioxide component of the sulphite acid, an acid-making tower, means for passing all of the residual burner gas containing the undissolved sulphur dioxide directly to said acid-making tower to form the sulphite salt solution of the system acid, a heat interchanger, means for passing the solution of sulphur dioxide collecting at the bottom of the dissolving chamber through the heat interchanger, a stripping chamber, means for introducing the heated sulphur dioxide solution into said stripping chamber, means for introducing a controlled flow of inert gas obtained from the acid making tower into the stripping chamber so that the gas passes counter-current to said heated solution and removes the dissolved sulphur dioxide therefrom, means for passing the heated water collecting at the bottom of said stripping chamber through the heat interchanger counter-current to the cool solution coming from the dissolving chamber so as to heat the solution and partially cool the water, a cooler, means for passing the partially cooled water through said cooler, means for introducing the cooled water into said dissolving chamber for a repetition of the cycle and means for introducing the concentrated sulphur dioxide gas in the stripping chamber to the acid-making tower so that it will pass counter-current to the sulphite salt solution and form the system acid containing the high concentration of free sulphur dioxide.

WALTER H. SWANSON.
LLOYD LANG.
DONALD C. PORTER.